(12) United States Patent
Wang et al.

(10) Patent No.: US 8,309,778 B2
(45) Date of Patent: Nov. 13, 2012

(54) CATALYST AND PROCESS FOR PRODUCING LIGHT AROMATIC HYDROCARBONS AND LIGHT ALKANES FROM HYDROCARBONACEOUS FEEDSTOCK

(75) Inventors: Deju Wang, Shanghai (CN); Zhongneng Liu, Shanghai (CN); Xueli Li, Shanghai (CN); Minbo Hou, Shanghai (CN); Zheming Wang, Shanghai (CN); Jianqiang Wang, Shanghai (CN)

(73) Assignees: China Petroleum & Chemical Corporation, Beijing (CN); Shanghai Research Institute of Petrochemical Technology Sinopec, Shanghai (CN)

( * ) Notice: Subject to any disclaimer, the term of this patent is extended or adjusted under 35 U.S.C. 154(b) by 0 days.

(21) Appl. No.: 13/290,596

(22) Filed: Nov. 7, 2011

(65) Prior Publication Data

US 2012/0053382 A1      Mar. 1, 2012

Related U.S. Application Data

(62) Division of application No. 12/175,835, filed on Jul. 18, 2008, now abandoned.

(30) Foreign Application Priority Data

| Jul. 18, 2007 | (CN) | 2007 1 0043940 |
| Jul. 18, 2007 | (CN) | 2007 1 0043941 |
| Jul. 18, 2007 | (CN) | 2007 1 0043942 |

(51) Int. Cl.
| C07C 4/06 | (2006.01) |
| C07C 6/12 | (2006.01) |
| C07C 5/22 | (2006.01) |

(52) U.S. Cl. ........ 585/448; 585/489; 585/752; 585/475; 585/481; 585/482; 208/137; 208/138

(58) Field of Classification Search .................. 585/488, 585/489, 752, 475, 481, 482; 208/137, 138
See application file for complete search history.

(56) References Cited

U.S. PATENT DOCUMENTS

| 3,729,409 | A | 4/1973 | Chen |
| 5,865,986 | A | 2/1999 | Buchanan et al. |
| 5,993,642 | A | 11/1999 | Mohr et al. |
| 5,994,603 | A | 11/1999 | Mohr et al. |
| 6,001,241 | A | 12/1999 | Gosling et al. |
| 6,946,583 | B2 | 9/2005 | Feng et al. |
| 2004/0167013 | A1 | 8/2004 | Ou et al. |
| 2005/0000860 | A1 | 1/2005 | Feng et al. |
| 2005/0075524 | A1 | 4/2005 | Feng et al. |
| 2006/0252632 | A1 | 11/2006 | Cody et al. |
| 2007/0093683 | A1 | 4/2007 | Iaccino et al. |

FOREIGN PATENT DOCUMENTS

| CN | 1915820 A | 2/2007 |
| CN | 1217892 C | 9/2007 |

OTHER PUBLICATIONS

Zhao Xue-song, et al., Gas phase transalkylation of diethylbenzene over a ZSM 5/ZSM 11 cocrystal zeolite catalyst, Journal of Natural Science of He Long Jiang University, 23(3):336-344 (2006), and English language abstract.

Shenglin Liu, et al., Upgrading of FCC Gasoline on MCM 2/ZSM 35 Cocrystal Molecular Sieve Catalyst, Petrochemical Technology, 319-323 (2005), and English language abstract.

*Primary Examiner* — Thuan D Dang

(74) *Attorney, Agent, or Firm* — Scully Scott Murphy & Presser, P.C.

(57) ABSTRACT

The present invention provides a catalyst comprising metallic Pt and/or Pd supported on a binder-free zeolite for producing light aromatic hydrocarbons and light alkanes from hydrocarbonaceous feedstock, wherein the amount of metallic Pt and/or Pd is of 0.01-0.8 wt %, preferably 0.01-0.5 wt % on the basis of the total weight of the catalyst, and the binder-free zeolite is selected from the group consisting of mordenite, beta zeolite, Y zeolite, ZSM-5, ZSM-11 and composite or cocrystal zeolite thereof. The present invention also provides a process for producing light aromatic hydrocarbons and light alkanes from hydrocarbonaceous feedstock using said catalyst.

23 Claims, No Drawings

CATALYST AND PROCESS FOR PRODUCING LIGHT AROMATIC HYDROCARBONS AND LIGHT ALKANES FROM HYDROCARBONACEOUS FEEDSTOCK

CROSS REFERENCE TO RELATED APPLICATION

The present application is a divisional application of U.S. Ser. No. 12/175,835, filed Jul. 18, 2008, the entire contents of which are incorporated herein by reference.

TECHNICAL FIELD

The present invention relates to a catalyst as well as the corresponding process for producing light aromatic hydrocarbons and light alkanes from hydrocarbonaceous feedstock.

BACKGROUND ART

Regarding the separation of aromatic hydrocarbons BTX, i.e., benzene, toluene and xylene, from non-aromatic hydrocarbons, some catalytic conversion processes have been developed in the prior art. For example, U.S. Pat. No. 3,729,409 disclosed converting non-aromatic hydrocarbons to lower alkanes by hydrocracking reaction and then separating aromatic hydrocarbons from non-aromatic hydrocarbons through gas-liquid separation; U.S. Pat. No. 5,865,986 and U.S. Pat. No. 6,001,241 disclosed a process for upgrading naphtha fraction, wherein a zeolite-based catalyst is used in some reactors to improve the production of aromatic hydrocarbons; and CN1217892C disclosed a similar process, wherein reformate, pyrolysis gasoline and the like are upgrade to produce LPG and light aromatic hydrocarbons.

The acidic catalyst used in these catalytic conversion processes would deactivate quickly due to coke and/or carbon-deposition, although this can be alleviated by supporting the metals with high hydrogenation activity and the hydrogenation activity of the catalyst also can be adjusted by varying the amount and/or the distribution of the supported metals, however, too high hydrogenation activity on the metallic center may result in side reaction of saturation of aromatic rings. With this regard, U.S. Pat. No. 5,865,986 proposed to adjust the metallic activity with sulfur compounds. Furthermore, U.S. Pat. No. 6,001,241 proposed to use Pb or Bi to control the degree of hydrogenation.

On the other hand, the zeolite molecular sieve powder used for said catalysts are generally manufactured into shaped particles with certain mechanical strengths and shapes, and during this manufacture some binders e.g. oxides such as $Al_2O_3$, $SiO_2$, $TiO_2$ and the like as well as clay minerals are needed usually. This is because the shaped catalysts are widely used in industries and have to suffer from various stresses during its use, thus, sufficient mechanical strengths are necessary for ensuring the whole catalytic process to be conducted smoothly, otherwise if the shaped catalysts have poor mechanical strengths, some problems such as the lines being blocked by fine powders, the liquid being distributed unevenly, the pressure drop being increased and the like would be introduced, so as to lead to poor catalytic efficiency, and even a unexpected shut-down in worse case.

However, introduction of binders during shaping the zeolite powders would reduce the concentration of effective components in the zeolite particles, resulting in reduced effective surface area, and thus the adsorption value would be reduced. This is because some binders would enter into part of channels of the zeolite or block part of pores of the zeolite, thus limiting the diffusion, resulting in poor adsorption ability and adsorption selectivity as well as reduced rates of adsorption and desorption, further the reduced activity and selectivity in the catalytic reactions; furthermore, undesired side reactions may be initiated in the presence of binders.

Regarding the above-mentioned disadvantages in connection with the introduction of binders during shaping the zeolite powders, the inventors have tried to develop a process for producing a binder-free zeolite, c.f. CN1915820A, which is incorporated herein by reference. The binder-free zeolite means that the shaped zeolite particles do not comprise inert binders, thus having high concentration of zeolite and large available surface area; furthermore, better properties in adsorption separation and ion exchange as well as better catalytic properties in some reactions are shown.

Based on the above-mentioned finding, the inventors further tried to develop a catalyst using said binder-free zeolite particles as support. Said catalyst has higher catalytic activity and stability and can be used for producing light aromatic hydrocarbons and light alkanes from hydrocarbonaceous feedstock.

SUMMARY OF THE INVENTION

The present invention provides a catalyst for producing light aromatic hydrocarbons and light alkanes from hydrocarbonaceous feedstock, wherein the binder-free zeolite was used to support noble metals as catalytic active components, so the catalyst possesses the advantages such as large acid density, unobstructed pores, moderate hydrogenation activity and the like, thus possessing excellent activity and stability.

Furthermore, the present invention provides a process for producing light aromatic hydrocarbons and light alkanes from hydrocarbonaceous feedstock using said catalyst, which process makes the separation of hydrocarbonaceous feedstock easier and brings higher additional values to heavy aromatic hydrocarbons and non-aromatic hydrocarbons.

Specifically, the present invention provides a catalyst comprising metallic Pt and/or Pd supported on a binder-free zeolite for producing light aromatic hydrocarbons and light alkanes from hydrocarbonaceous feedstock, wherein the amount of metallic Pt and/or Pd is of 0.01-0.8 wt %, preferably 0.01-0.5 wt % on the basis of the total weight of the catalyst, and the binder-free zeolite is selected from the group consisting of mordenite, beta zeolite, Y zeolite, ZSM-5, ZSM-11 and composite or cocrystal zeolite thereof.

According to the catalyst of the present invention, the binder-free zeolite preferably is selected from the group consisting of ZSM-5, mordenite, beta zeolite, ZSM-5/USY composite zeolite, ZSM-5/beta composite zeolite, or ZSM-5/ZSM-11 cocrystal zeolite.

According to the catalyst of the present invention, it may further comprise a promoter selected from the group consisting of Cu, Zn, Sn, Pb, Fe and mixture thereof, preferably from the group consisting of Zn, Sn, Pb and mixture thereof, most preferably Zn, in amount of less than 1 wt %, preferably less than 0.6 wt % on the basis of the total weight of the catalyst.

According to the catalyst of the present invention, wherein the binder-free zeolite has a molar ratio $SiO_2/Al_2O_3$ in range of 10-200, preferably 20-100, and a pore size of about 4-8 Å, preferably 5-7 Å generally.

According to the catalyst of the present invention, the acidic center can be adjusted by varying the molar ratio $SiO_2/Al_2O_3$ of the binder-free zeolite, and the hydrogenation activity can be adjusted by varying the supported amount of Pt and/or Pd as well as the distribution thereof, thus making the acidic center and metallic center of the catalyst match with each other.

Furthermore, when using Pt and Pd in combination as catalytic active metals, the catalyst of the present invention may possess better sulfur resistance without compromising the excellent hydrogenation property, thus it can be adapted to the feedstock comprising sulfur compounds such as pyrolysis gasoline very well. This is because when being used in combination rather than being present separately in the catalyst, some electrical or chemical effects are occurring between Pt and Pd by complex thereof, so that providing excellent hydrogenation and sulfur resistance properties.

The catalyst according to the present invention can be prepared as following: firstly synthesizing Na-type binder-free zeolite, converting the Na-type binder-free zeolite into H-type binder-free zeolite by ion exchange with ammonium salt solution or acid solution such as hydrochloric acid and the like followed by calcination, then supporting Pt and/or Pd as catalytic active metals thereon by ion exchange or impregnation, finally drying the obtained catalyst at a temperature of less than 200° C. and calcining the same at a temperature of 300-600° C.

During the above-mentioned preparation, the precursor of the catalytic active metals can be the aqueous solutions of palladium chloride, palladium nitrate, palladic chloride, palladous chloride, ammonium palladic chloride, ammonium palladous chloride, platinum nitrate, platinum chloride, platinic chloride, platinous chloride, ammonium platonic chloride, ammonium platinous chloride, tetraammineplatinum chloride and mixture thereof; furthermore, a promoter selected from the group consisting of Cu, Zn, Sn, Pb, Fe and mixture thereof can be added in amount of less than 1 wt %, preferably less than 0.6 wt % on the basis of the total weight of the catalyst to adjust the hydrogenation activity of the catalytic active metals.

Furthermore, the present invention provides a process for producing light aromatic hydrocarbons and light alkanes from hydrocarbonaceous feedstock, comprising the following steps:

(a) introducing hydrogen and a hydrocarbonaceous feedstock having boiling point in range of 30-250° C. into at least one reaction zone;

(b) converting the hydrocarbonaceous feedstock to an effluent enriched in light aromatic hydrocarbons of benzene, toluene and xylene and light alkanes in the reaction zone in the presence of the catalyst according to the present invention, wherein of the hydrocarbonaceous feedstock the heavy aromatic hydrocarbons are subjected to hydrodealkylation and/or transalkylation with light aromatic hydrocarbon, the light aromatic hydrocarbons are subjected to isomerization and the non-aromatic hydrocarbons are subjected to hydrocracking reaction; and (c) recovering the light aromatic hydrocarbons and the light alkanes respectively by passing the effluent through gas-liquid separation and distillation sequentially, and the separated heavy fraction is recycled to the reaction zone for further reaction.

In the process for producing light aromatic hydrocarbons and light alkanes from hydrocarbonaceous feedstock according to the present invention, wherein:

in step (a), the hydrocarbonaceous feedstock is introduced into the reaction zone at a weight hour space velocity of 0.5-10 $hr^{-1}$, preferably 1-4 $hr^{-1}$, and the molar ratio of hydrogen to the hydrocarbonaceous feedstock is of 0.5:1-10:1, preferably 2:1-8:1, wherein the hydrocarbonaceous feedstock is selected from the group consisting of reformate, pyrolysis gasoline, naphtha and mixture thereof;

in step (b), the reaction temperature is of 250-600° C., preferably 300-500° C., and the reaction pressure is of 0.5-5.0 MPa, preferably 2.0-4.0 MPa; and in step (c), passing the effluent through a gas-liquid separator to obtain first overhead stream comprising hydrogen, methane, ethane and LPG and first bottom stream comprising aromatic hydrocarbons as well as residual hydrogen and non-aromatic hydrocarbons, recovering LPG from the first overhead stream; and passing the first bottom stream through a distillation column to obtain second overhead stream comprising residual hydrogen and non-aromatic hydrocarbons and second bottom stream comprising aromatic hydrocarbons, further recovering LPG from the second overhead stream, and recovering aromatic hydrocarbons from the second bottom stream.

In the process for producing light aromatic hydrocarbons and light alkanes from hydrocarbonaceous feedstock according to the present invention, a target product can be obtained by varying the feedstock or the composition of the feedstock, e.g. a feedstock with high concentration of aromatic hydrocarbons such as reformate and pyrolysis gasoline can be used to improve the yield of aromatic hydrocarbons, and a feedstock with high concentration of non-aromatic hydrocarbons such as naphtha can be used to obtain LPG primarily.

In the process for producing light aromatic hydrocarbons and light alkanes from hydrocarbonaceous feedstock according to the present invention, in the presence of the catalyst according to the present invention, benzene, toluene and xylene (BTX), which are important raw organic materials in petrochemical industry, can be obtained through some simultaneous reactions of hydrocracking reaction of non-aromatic hydrocarbons as well as hydrodealkylation, transalkylation and isomerization of aromatic hydrocarbons; at the same time, light alkanes including LPG are produced as by products.

In the process for producing light aromatic hydrocarbons and light alkanes from hydrocarbonaceous feedstock according to the present invention, of the reactions in step (b), hydrocracking reaction is most important because the non-aromatic hydrocarbons in the hydrocarbonaceous feedstock are hydrocracked into light alkanes enriched in LPG, thus the solvent extraction and the like are not necessary for the separation of aromatic hydrocarbons from non-aromatic hydrocarbons; furthermore, hydrodealkylation, transalkylation and isomerization upgrade the aromatic hydrocarbons in the hydrocarbonaceous feedstock, e.g., $C_9^+$ aromatic hydrocarbons used as fuel oils can be converted into benzene, toluene and xylene (BTX) through dealkylation, toluene and xylene can be produced through transalkylation between benzene and $C_9^+$ aromatic hydrocarbons, and $C_8$ aromatic hydrocarbons can be subjected to isomerization furthermore; on the other hand, some olefinic intermediates such as ethylene and propylene can be produced during hydrocracking and dealkylation, however, they will be hydrogenated to saturation quickly, so the catalyst will not deactivate due to the coke resulted from olefins polymerization and the aromatic hydrocarbons in the product will not degrade due to transalkylation between olefins and light aromatic hydrocarbons.

DETAILED DESCRIPTION OF THE INVENTION

Now the present invention is further described in details by following non-limiting examples.

Example 1

A mixture of a solution of tetrapropylammonium hydroxide (TPAOH), tetraethyl orthosilicate (TEOS) and water in molar ratio of $(TPA)_2O:5.5TEOS:90H_2O$ was stirred homogeneously, then aged and refluxed for 3-day at 80° C. to obtain ZSM-5 seed crystal orienting agent. Dosing 180 g white carbon black, 10 g sesbania flour, an aqueous solution of 19.7 g sodium aluminate and 40 g ZSM-5 seed crystal orienting agent, further adding 230 g silica sol (40 wt %) and required amount of water, then kneading and drying to obtain a cylindrical precursor. In a reaction vessel, to which a mixture of 35 g ethylenediamine and 5 g distilled water was pre-added, 150 g cylindrical precursor as above-prepared was placed on a porous stainless steel screen therein, and a vapor-solid phase treatment was carried out at 160° C. for 5-day after sealing the reaction vessel. The product was washed with distilled water and dried, then was calcined at 550° C. in air. The calcined product was demonstrated to be a binder-free ZSM-5 zeolite by XRD characterization and has a molar ratio $SiO_2/Al_2O_3$ of 54.6 and a compressive strength of 50N/mm as determined. Then the binder-free ZSM-5 zeolite was converted into H-type zeolite through ion exchange with a solution of ammonium nitrate and calcination. Supporting 0.15 wt % Pd and 0.15 wt % Pt on the H-type binder-free ZSM-5 zeolite by impregnation, then calcining at 400° C. for 4-hour to prepare catalyst A.

Example 2

Mixing 100 g white carbon black, 20 g USY zeolite with a molar ratio $SiO_2/Al_2O_3$ of 16 and 20 g ZSM-5 seed crystal orienting agent from example 1, adding aqueous solution of 26 g $Al_2(SO_4)_3 \cdot 18H_2O$ to adjust the Si/Al ratio, further adding 150 g silica sol (40 wt %), then kneading and drying to obtain a cylindrical precursor. In a reaction vessel, to which a mixture of 34 g ethylamine and 5 g distilled water was pre-added, 100 g cylindrical precursor as above-prepared was placed on a porous stainless steel screen therein, and a vapor-solid phase treatment was carried out at 180° C. for 5-day after sealing the reaction vessel. The product was washed with distilled water and dried, then was calcined at 550° C. in air. The calcined product was demonstrated to be a binder-free ZSM-5/USY composite zeolite by XRD characterization, ZSM-5 zeolite and USY zeolite therein are at amounts of 91 wt % and 9 wt % respectively as determined through quantitative analysis by XRD, ZSM-5 zeolite therein has a molar ratio $SiO_2/Al_2O_3$ of 68.1 as determined and a determined compressive strength of the calcined product is of 85N/mm. And it was shown by SEM that ZSM-5 zeolite and USY zeolite are cross-growing in the calcined product. Then the binder-free ZSM-5/USY composite zeolite was converted into H-type zeolite through ion exchange with a solution of ammonium nitrate and calcination. Supporting 0.3 wt % Pd on the H-type binder-free ZSM-5/USY composite zeolite by ion exchange, then calcining at 400° C. for 4-hour to prepare catalyst B.

Example 3

Mixing 180 g white carbon black, 140 g beta zeolite with a molar ratio $SiO_2/Al_2O_3$ of 20 and 40 g ZSM-5 seed crystal orienting agent from example 1, adding an aqueous solution of 110 g $Al_2(SO_4)_3 \cdot 18H_2O$ to adjust the Si/Al ratio, further adding 220 g silica sol (40 wt %), then kneading and drying to obtain a cylindrical precursor. In a reaction vessel, to which a mixture of 40 g ethylamine and 5 g distilled water was pre-added, 100 g cylindrical precursor as above-prepared was placed on a porous stainless steel screen therein, and a vapor-solid phase treatment was carried out at 150° C. for 7-day after sealing the reaction vessel. The product was washed with distilled water and dried, then was calcined at 550° C. in air. The calcined product was demonstrated to be a binder-free ZSM-5/beta composite zeolite by XRD characterization, ZSM-5 zeolite and beta zeolite therein are at amounts of 70.5 wt % and 29.5 wt % respectively as determined through quantitative analysis by XRD, ZSM-5 zeolite therein has a molar ratio $SiO_2/Al_2O_3$ of 26.5 as determined and a determined compressive strength of the calcined product is of 87N/mm. And it was shown by SEM that ZSM-5 zeolite and beta zeolite are cross-growing in the calcined product. Then the binder-free ZSM-5/beta composite zeolite was converted into H-type zeolite through ion exchange with a solution of ammonium nitrate and calcination. Supporting 0.10 wt % Pd and 0.10 wt % Pt on the H-type binder-free ZSM-5/beta composite zeolite by ion exchange, then calcining at 400° C. for 4-hour to prepare catalyst C.

Example 4

Supporting 0.20 wt % Pt and 0.15 wt % Cu on the H-type binder-free ZSM-5 zeolite prepared in example 1 by ion exchange, then calcining at 400° C. for 4-hour to prepare catalyst D.

Example 5

Mixing 120 g white carbon black, 5 g sesbania flour, 22.4 g sodium aluminate with an amount of $Al_2O_3$ of 43 wt % and 200 g beta zeolite with a molar ratio $SiO_2/Al_2O_3$ of 30, further adding 300 g silica sol (40 wt %), then kneading and drying to obtain a cylindrical precursor. A mixture of 60 g cylindrical precursor as above-prepared and 83 g solution of tetraethylammonium hydroxide (TEAOH)(13 wt %) was charged into a crystallization vessel to experience a hydrothermal treatment at 145° C. for 4-day therein. The product was washed with distilled water and dried, then was calcined at 550° C. in air. The calcined product was demonstrated to be a binder-free beta zeolite by XRD characterization and has a molar ratio $SiO_2/Al_2O_3$ of 40 and a compressive strength of 58N/mm as determined. Then the binder-free beta zeolite was converted into H-type zeolite through ion exchange with a solution of ammonium nitrate and calcination. Supporting 0.15 wt % Pd and 0.15 wt % Pt on the H-type binder-free beta zeolite by ion exchange, then calcining at 400° C. for 4-hour to prepare catalyst E.

Example 6

Mixing 180 g white carbon black, 12 g sesbania flour, 50 g $SiO_2$-containing pseudo-boehmite powder ($SiO_2$:26 wt %, $Al_2O_3$:44 wt % and $H_2O$:30 wt %), 21 g sodium hydroxide, 60 g mordenite with a molar ratio $SiO_2/Al_2O_3$ of 20 and 550 g silica sol (40 wt %), then kneading and drying to obtain a cylindrical precursor. A mixture of 60 g cylindrical precursor as above-prepared and 120 g solution of sodium hydroxide (2.5 wt %) was charged into a crystallization vessel to experience a hydrothermal treatment at 160° C. for 3-day therein. The product was washed with distilled water and dried, then was calcined at 550° C. in air. The calcined product was demonstrated to be a binder-free mordenite zeolite by XRD characterization and has a molar ratio $SiO_2/Al_2O_3$ of 30 and a compressive strength of 65N/mm as determined. Then the binder-free mordenite was converted into H-type zeolite through ion exchange with a solution of ammonium nitrate and calcination. Supporting 0.15 wt % Pd and 0.15% wtPt on the H-type binder-free mordenite by ion exchange, then calcining at 400° C. for 4-hour to prepare catalyst F.

Example 7

A mixture of a solution of tetrabutylammonium hydroxide (TBAOH), tetraethyl orthosilicate (TEOS) and water in molar ratio of $(TBA)_2O:6.22TEOS:163H_2O$ was stirred homogeneously, then aged and refluxed at 95° C. for 3-day to obtain ZSM-11 seed crystal orienting agent. Dosing 200 g white carbon black, 12.5 g sesbania flour, 36 g $SiO_2$-containing pseudo-boehmite powder ($SiO_2$:26 wt %, $Al_2O_3$:44 wt % and $H_2O$:30 wt %) and 51 g ZSM-11 seed crystal orienting agent, adding 20 g aqueous solution of sodium hydroxide, further adding 475 g silica sol (40 wt %), then kneading and drying to obtain a cylindrical precursor. A mixture of 40 g cylindrical precursor as above-prepared and 80 g solution of tetrabutylammonium hydroxide (TBAOH)(8 wt %) was charged into a crystallization vessel to experience a hydrothermal treatment at 160° C. for 3-day therein. The product was washed with distilled water and dried, then was calcined at 550° C. in air. The calcined product was demonstrated to be a binder-free ZSM-11 zeolite by XRD characterization and has a molar ratio $SiO_2/Al_2O_3$ of 43 and a compressive strength of 55N/mm as determined. Then the binder-free ZSM-11 zeolite was converted into H-type zeolite through ion exchange with a solution of ammonium nitrate and calcination. Supporting 0.15 wt % Pd and 0.15 wt % Pt on the H-type binder-free ZSM-11 zeolite by impregnation, then calcining at 400° C. for 4-hour to prepare catalyst G.

Example 8

Mixing 200 g white carbon black and 80 g Na-type ZSM-5 zeolite with a molar ratio $SiO_2/Al_2O_3$ of 60, adding 26 g sodium aluminate with an amount of $Al_2O_3$ of 43 wt % to adjust the Si/Al ratio, further adding 45 g ZSM-5 seed crystal orienting agent from example 1, further adding 410 g silica sol (40 wt %) and 30 g water, then kneading and drying to obtain a cylindrical precursor. In a reaction vessel, to which a mixture of 34 g ethylamine and 5 g distilled water was pre-added, 100 g cylindrical precursor as above-prepared was placed on a porous stainless steel screen therein, and a vapor-solid phase treatment was carried out at 180° C. for 5-day after sealing the reaction vessel. The product was washed with distilled water and dried, then was calcined at 550° C. in air. The calcined product was demonstrated to be a binder-free ZSM-5 zeolite by XRD characterization and has a molar ratio $SiO_2/Al_2O_3$ of 56 and a compressive strength of 110N/mm as determined. Then the binder-free ZSM-5 zeolite was converted into H-type zeolite through ion exchange with a solution of ammonium nitrate and calcination. Supporting 0.04 wt % Pd and 0.04 wt % Pt on the H-type binder-free ZSM-5 zeolite by ion exchange, then calcining at 430° C. for 4-hour to prepare catalyst H.

Example 9

Supporting 0.04 wt % Pt and 0.13 wt % Pb on the H-type binder-free ZSM-5 zeolite prepared in example 8 by ion exchange, then calcining at 400° C. for 4-hour to prepare catalyst I.

Example 10

Supporting 0.01 wt % Pt and 0.03 wt % Sn on the H-type binder-free ZSM-5 zeolite prepared in example 8 by ion exchange, then calcining at 400° C. for 4-hour to prepare catalyst J.

In order to evaluate the properties, testing the above-prepared catalysts A-J in a fixed bed reactor under following conditions:

Composition of the hydrocarbonaceous feedstock (wt %): $<C_6$ non-aromatic hydrocarbons 3.99, $C_{6-8}$ non-aromatic hydrocarbons 3.563, $C_{6-8}$ aromatic hydrocarbons 71.662 (wherein ethylbenzene 5.14 and xylene 9.142), $C_9$ 15.471 (wherein indane 2.466), and $C_{10}^+$5.314 (wherein tetrahydrodicyclopentadiene 4.481); and Process conditions: hydrogen pressure 3.0 MPa, $H_2$/oil volume ratio 400, inlet temperature 400° C., and WHSV 2.0-4.0 $hr^{-1}$.

The results of reaction are shown in table 1.

TABLE 1

Test results on catalysts

| Catalyst | | A | B | C | D | E | F | G | H | I | J |
|---|---|---|---|---|---|---|---|---|---|---|---|
| WHSV/$hr^{-1}$ | | 3.7 | 3.0 | 3.0 | 3.0 | 3.0 | 2.5 | 2.0 | 2.0 | 2.0 | 2.0 |
| Distribution of reaction product (wt %) | $<C_6$ non-aromatic hydrocarbons | 14.90 | 14.31 | 13.25 | 13.53 | 13.98 | 14.40 | 15.02 | 15.50 | 13.78 | 13.27 |
| | $C_{6-8}$ aromatic hydrocarbons | 79.48 | 78.65 | 75.86 | 76.08 | 78.99 | 79.21 | 81.92 | 82.05 | 82.4 | 81.0 |
| | $C_{6-8}$ non-aromatic hydrocarbons | 0.18 | 0.095 | 0.37 | 0.23 | 0.27 | 0.18 | 0.056 | 0.051 | 0.015 | 0.03 |
| | $C_9$ | 3.50 | 3.87 | 4.02 | 3.45 | 3.78 | 3.21 | 2.95 | 2.78 | 2.56 | 3.56 |
| | Ethylbenzene | 0.69 | 1.50 | 2.80 | 2.20 | 3.20 | 2.9 | 0.90 | 0.95 | 0.80 | 1.20 |
| | Xylene | 11.38 | 11.72 | 10.58 | 11.26 | 12.05 | 12.10 | 11.80 | 11.72 | 11.50 | 12.0 |
| Conversion of $C_{6-8}$ non-aromatic hydrocarbons (%) | | 94.95 | 97.00 | 89.62 | 93.54 | 92.42 | 94.95 | 98.43 | 98.57 | 99.6 | 99.2 |
| Conversion of $C_9$(%) | | 77.38 | 75.00 | 74.02 | 77.70 | 75.57 | 79.25 | 80.93 | 82.03 | 83.45 | 76.99 |

Comparative Examples 1-2

Using silica and alumina as binders, shaping raw H-type ZSM-5 zeolite powder with a molar ratio $SiO_2/Al_2O_3$ of 60, drying and then calcining at 550° C. for 4-hour to prepare a shaped H-type ZSM-5 zeolite comprising 28.6 wt % of silica as binder and a shaped H-type ZSM-5 zeolite comprising 34.4 wt % of alumina as binder respectively. Supporting 0.04 wt % Pt and 0.13 wt % Pb on both of the above-prepared H-type ZSM-5 zeolites by impregnation, and then calcining at 450° C. for 4-hour to prepare catalysts R and S.

In order to evaluate the properties, testing the above-prepared catalysts R—S in a fixed bed reactor, wherein the feedstocks and the process conditions being same as that in example 9.

The results of reaction are shown in table 2.

TABLE 2

Test results on catalysts

| | | Catalyst | |
|---|---|---|---|
| | | R | S |
| Distribution of reaction product (wt %) | <$C_6$ non-aromatic hydrocarbons | 11.22 | 13.83 |
| | $C_{6-8}$ aromatic hydrocarbons | 74.82 | 75.02 |
| | $C_{6-8}$ non-aromatic hydrocarbons | 0.27 | 0.18 |
| | $C_9$ | 8.37 | 6.89 |
| | Ethylbenzene | 4.12 | 3.6 |
| | Xylene | 9.32 | 9.18 |
| Conversion of $C_{6-8}$ non-aromatic hydrocarbons (%) | | 92.42 | 94.95 |
| Conversion of $C_9$ (%) | | 45.90 | 55.46 |

As can be seen from the data in tables 1-2, under the same process conditions, compared with the catalysts based on zeolite comprising binders in the prior art, the catalyst based on binder-free zeolite according to the present invention shows much better activities for hydrodealkylation and cracking reaction, specifically, the conversion of $C_9$ is much higher.

Example 11

Supporting 0.04 wt % Pt and 0.13 wt % Sn on the H-type binder-free ZSM-5 zeolite prepared in example 1 by ion exchange, then calcining at 450° C. for 4-hour to prepare catalyst K.

Example 12

Supporting 0.5 wt % Pd on the H-type binder-free ZSM-5 zeolite prepared in example 1 by ion exchange, then calcining at 450° C. for 4-hour to prepare catalyst L.

Example 13

Supporting 0.04 wt % Pd and 0.04 wt % Pt on the H-type binder-free ZSM-5 zeolite prepared in example 1 by ion exchange, then calcining at 450° C. for 4-hour to prepare catalyst M.

In order to evaluate the properties, testing the above-prepared catalysts K-M in a fixed bed reactor under following conditions:

Composition of the hydrocarbonaceous feedstock (wt %): <$C_6$ non-aromatic hydrocarbons 2.33, $C_{6-8}$ non-aromatic hydrocarbons 2.393, $C_{6-8}$ aromatic hydrocarbons 76.578 (wherein ethylbenzene 6.748 and xylene 8.884), $C_{9-12.49}$ (wherein indane 3.425), $C_{10}^+$ 6.206 (wherein tetrahydrodicyclopentadiene 3.318), bromine value 14.00 g $Br_2$/100 g of the feedstock, and sulfur concentration 105 ppm; and Process conditions: hydrogen pressure 3.0 MPa, $H_2$/oil volume ratio 500, inlet temperature 350-370° C., and WHSV 2.0-5.0 $hr^{-1}$.

The results of reaction are shown in table 3. The data show that a better conversion of $C_9$ can be obtained with the catalyst according to the present invention, even though the feedstock comprises sulfur and unsaturated components.

TABLE 3

Test results on catalysts

| | | Catalyst | | |
|---|---|---|---|---|
| | | K | L | M |
| Inlet temperature ° C. | | 350 | 370 | 370 |
| WHSV/$hr^{-1}$ | | 4.2 | 2.1 | 2.1 |
| Distribution of reaction product (wt %) | <$C_6$ non-aromatic hydrocarbons | 10.14 | 8.93 | 9.59 |
| | $C_{6-8}$ aromatic hydrocarbons | 84.21 | 81.12 | 82.78 |
| | $C_{6-8}$ non-aromatic hydrocarbons | 0 | 0.12 | 0 |
| | $C_9$ | 2.78 | 3.98 | 2.98 |
| | Ethylbenzene | 1.88 | 2.51 | 1.68 |
| | Xylene | 9.69 | 8.96 | 9.07 |
| Conversion of $C_{6-8}$ non-aromatic hydrocarbons (%) | | 100 | 94.98 | 100 |
| Conversion of $C_9$ (%) | | 77.74 | 68.13 | 76.14 |

Example 14

Supporting 0.05 wt % Pt and 0.08 wt % Zn on the H-type binder-free ZSM-5 zeolite prepared in example 8 by ion exchange, then calcining at 400° C. for 4-hour to prepare catalyst N.

Example 15

A mixture of 40 g cylindrical precursor prepared in example 7 and 80 g solution comprising 5 wt % of tetrabutylammonium hydroxide (TBAOH) and 3 wt % of tetrapropylammonium hydroxide (TPAOH) was charged into a crystallization vessel to experience a hydrothermal treatment at 170° C. for 3-day therein. The product was washed with distilled water and dried, then was calcined at 550° C. in air. The calcined product was demonstrated to be a binder-free ZSM-5/ZSM-11 cocrystal zeolite by XRD characterization and has a molar ratio $SiO_2/Al_2O_3$ of 42.9 and a compressive strength of 62N/mm as determined. Then the binder-free ZSM-5/ZSM-11 cocrystal zeolite was converted into H-type zeolite through ion exchange with a solution of ammonium nitrate and calcination. Supporting 0.05 wt % Pt and 0.08 wt % Zn on the H-type binder-free ZSM-5/ZSM-11 cocrystal zeolite by impregnation, then calcining at 400° C. for 4-hour to prepare catalyst O.

In order to evaluate the properties, testing the above-prepared catalysts N—O in a fixed bed reactor by running for 1000-hour continuously under following conditions:

Composition of the hydrocarbonaceous feedstock (wt %): <$C_6$ non-aromatic hydrocarbons 0.144, $C_{6-8}$ non-aromatic hydrocarbons 2.985, $C_{6-8}$ aromatic hydrocarbons 52.098 (wherein ethylbenzene 8.145 and xylene 9.892), $C_9$ 30.069 (wherein indane 8.084), and $C_{10}^+$ 14.704 (wherein tetrahydrodicyclopentadiene 3.408); and Process conditions: hydrogen pressure 3.0 MPa, $H_2$/oil volume ratio 500, inlet temperature 380° C., and WHSV 2.1 $hr^{-1}$.

The results of reaction after running for 1000-hour are shown in table 4.

TABLE 4

Test results on catalysts

| | | Catalyst | |
|---|---|---|---|
| | | N | O |
| Distribution of reaction product (wt %) | <$C_6$ non-aromatic hydrocarbons | 18.56 | 20.43 |
| | $C_{6-8}$ aromatic hydrocarbons | 71.30 | 72.54 |
| | $C_{6-8}$ non-aromatic hydrocarbons | 0.26 | 0.10 |
| | $C_9$ | 4.17 | 2.73 |
| | Ethylbenzene | 0.42 | 0.36 |
| | Xylene | 17.17 | 10.02 |
| Conversion of $C_{6-8}$ non-aromatic hydrocarbons (%) | | 91.29 | 96.65 |
| Conversion of $C_9$ (%) | | 86.13 | 90.92 |

As can be seen from the data in table 4, as to the catalyst according to the present invention, when Zn being used as the promoter, a higher conversion of $C_9$ can be obtained, and when ZSM-5/ZSM-11 cocrystal zeolite being used, the conversion of $C_9$ can be improved furthermore.

Example 16

Supporting 0.35 wt % Pd and 0.60 wt % Zn on the H-type binder-free ZSM-5 zeolite prepared in example 8 by ion exchange, then calcining at 400° C. for 4-hour to prepare catalyst P.

In order to evaluate the properties, testing catalyst P in a fixed bed reactor under following conditions:

Composition of the hydrocarbonaceous feedstock (wt %): $O_{6-8}$ aromatic hydrocarbons 11.552 (wherein ethylbenzene 2.367 and xylene 9.185), $C_{9-66.203}$ (wherein indane 17.154), and $C_{10}^+$22.245 (wherein tetrahydrodicyclopentadiene 15.155); and Process conditions: hydrogen pressure 3.0 MPa, $H_2$/oil volume ratio 800, inlet temperature 380° C., and WHSV 2.0 $hr^{-1}$.

The results of reaction are shown in table 5.

Example 17

Supporting 0.04 wt % Pt, 0.12 wt % Pd and 0.20 wt % Zn on the H-type binder-free ZSM-5 zeolite prepared in example 8 by ion exchange, then calcining at 400° C. for 4-hour to prepare catalyst Q.

In order to evaluate the properties, testing catalyst Q in a fixed bed reactor under following conditions:

Composition of the hydrocarbonaceous feedstock (wt %): $C_{6-8}$ aromatic hydrocarbons 11.704 (wherein ethylbenzene 2.121 and xylene 9.031), $C_9$ 62.627 (wherein indane 16.546), and $C_{10}^+$25.669 (wherein tetrahydrodicyclopentadiene 16.702); and Process conditions: hydrogen pressure 3.0 MPa, $H_2$/oil volume ratio 800, inlet temperature 380° C., and WHSV 2.0 $hr^{-1}$.

The results of reaction are shown in table 5.

TABLE 5

Test results on catalysts

| | | Catalyst | |
|---|---|---|---|
| | | P | Q |
| distribution of reaction product (wt %) | <$C_6$ non-aromatic hydrocarbons | 33.938 | 38.404 |
| | $C_{6-8}$ aromatic hydrocarbons | 56.875 | 54.904 |
| | $C_{6-8}$ non-aromatic hydrocarbons | 0 | 0 |
| | $C_9$ | 3.977 | 4.318 |
| | $C_{10}^+$ | 5.21 | 2.374 |
| | Ethylbenzene | 0.675 | 0.205 |
| | Xylene | 14.029 | 16.306 |
| | Indane | 0.058 | 0 |
| | Tetrahydrodicyclopentadiene | 0.257 | 0.206 |
| Conversion of $C_9$ (%) | | 93.99 | 93.10 |

Example 18

In order to evaluate the properties, testing catalyst N prepared in example 14 in a fixed bed reactor by running for 1500-hour continuously, wherein the feedstock and the process conditions being same as that in example 17.

The results of reaction at different time points during running for 1500-hour are shown in table 6.

TABLE 6

Test results on catalysts

| | | Time of running/hr | | |
|---|---|---|---|---|
| | | 384 | 826 | 1450 |
| distribution of reaction product (wt %) | <$C_6$ non-aromatic hydrocarbons | 26.012 | 25.859 | 30.23 |
| | $C_{6-8}$ aromatic hydrocarbons | 58.495 | 57.196 | 57.006 |
| | $C_{6-8}$ non-aromatic hydrocarbons | 0 | 0 | 0 |
| | $C_9$ | 7.249 | 7.575 | 6.594 |
| | $C_{10}^+$ | 8.244 | 9.370 | 6.170 |
| | Ethylbenzene | 0.228 | 0.164 | 0.143 |
| | Xylene | 16.657 | 17.061 | 17.554 |
| | Indane | 0.182 | 0.183 | 0.075 |
| | Tetrahydrodicyclopentadiene | 4.293 | 5.077 | 2.917 |
| Conversion of $C_9$ (%) | | 88.42 | 87.90 | 89.47 |

As can be seen from the data in tables 5-6, the catalyst according to the present invention can achieve better conversion and stability, even though the feedstock comprises heavy aromatic hydrocarbons at higher amounts.

What is claimed is:

1. A process for producing light aromatic hydrocarbons and light alkanes from hydrocarbonaceous feedstock, comprising the following steps:
    (a) introducing hydrogen and a hydrocarbonaceous feedstock having boiling point in range of 30-250° C. into at least one reaction zone;
    (b) converting the hydrocarbonaceous feedstock to an effluent enriched in light aromatic hydrocarbons of benzene, toluene and xylene and light alkanes in the reaction zone in the presence of a catalyst, wherein of the hydrocarbonaceous feedstock the heavy aromatic hydrocarbons are subjected to hydrodealkylation and/or transalkylation with light aromatic hydrocarbon, the light aromatic hydrocarbons are subjected to isomerization and the non-aromatic hydrocarbons are subjected to hydrocracking reaction, and the catalyst comprises metallic Pt and/or Pd supported on a binder-free zeolite for producing light aromatic hydrocarbons and light alkanes from hydrocarbonaceous feedstock, wherein the amount of metallic Pt and/or Pd is of 0.01-0.8 wt % on the basis of the total weight of the catalyst, and the binder-free zeolite is selected from the group consisting of mordenite, beta zeolite, Y zeolite, ZSM-5, ZSM-11 and composite or cocrystal zeolite thereof; and (c) recovering the light aromatic hydrocarbons and the light alkanes respectively by passing the effluent through gas-liquid separation and distillation sequentially, and the separated heavy fraction is recycled to the reaction zone for further reaction.

2. The process according to claim 1, wherein in step (a) the hydrocarbonaceous feedstock is introduced into the reaction zone at a weight hour space velocity of 0.5-10 $hr^{-1}$, and the molar ratio of hydrogen to the hydrocarbonaceous feedstock is of 0.5:1-10:1.

3. The process according to claim 1, wherein in step (b) the reaction temperature is of 250-600° C. and the reaction pressure is of 0.5-5.0 MPa.

4. The process according to claim 1, wherein the hydrocarbonaceous feedstock is selected from the group consisting of reformate, pyrolysis gasoline, naphtha and mixture thereof.

5. The process according to claim 1, wherein step (c) comprises passing the effluent through a gas-liquid separator to obtain first overhead stream comprising hydrogen, methane, ethane and LPG and first bottom stream comprising aromatic hydrocarbons as well as residual hydrogen and non-aromatic hydrocarbons, recovering LPG from the first overhead stream; and passing the first bottom stream through a distillation column to obtain second overhead stream comprising residual hydrogen and non-aromatic hydrocarbons and second bottom stream comprising aromatic hydrocarbons, further recovering LPG from the second overhead stream, and recovering aromatic hydrocarbons from the second bottom stream.

6. The process according to claim 2, wherein in step (b) the reaction temperature is 250-600° C., and the reaction pressure is 0.5-5.0 MPa.

7. The process according to claim 2, wherein the hydrocarbonaceous feedstock is selected from the group consisting of reformate, pyrolysis gasoline, naphtha and mixture thereof.

8. The process according to claim 2, wherein step (c) comprises passing the effluent through a gas-liquid separator to obtain first overhead stream comprising hydrogen, methane, ethane and LPG and first bottom stream comprising aromatic hydrocarbons as well as residual hydrogen and non-aromatic hydrocarbons, recovering LPG from the first overhead stream; and passing the first bottom stream through a distillation column to obtain second overhead stream comprising residual hydrogen and non-aromatic hydrocarbons and second bottom stream comprising aromatic hydrocarbons, further recovering LPG from the second overhead stream, and recovering aromatic hydrocarbons from the second bottom stream.

9. The process according to claim 1, wherein the binder-free zeolite is ZSM-5, mordenite, beta zeolite, ZSM-5/USY composite zeolite, ZSM-5/beta composite zeolite, or ZSM-5/ZSM-11 cocrystal zeolite.

10. The process according to claim 1, wherein the catalyst further comprises a promoter selected from the group consisting of Cu, Zn, Sn, Pb, Fe and mixture thereof in amount of less than 1 wt %.

11. The process according to claim 10, wherein the promoter is Zn.

12. The process according to claim 1, wherein the binder-free zeolite has a molar ratio $SiO_2/Al_2O_3$ in the range of 10-200.

13. The process according to claim 9, wherein the catalyst further comprises a promoter selected from the group consisting of Cu, Zn, Sn, Pb, Fe and mixture thereof in amount of less than 1 wt %.

14. The process according to claim 13, wherein the promoter is Zn.

15. The process according to claim 14, wherein the binder-free zeolite has a molar ratio $SiO_2/Al_2O_3$ in the range of 10-200.

16. The process according to claim 2 wherein the hydrocarbonaceous feedstock is introduced into the reaction zone at a weight hour space velocity of 1-4 $hr^{-1}$ and a molar ratio of hydrogen to the hydrocarbonaceous feedstock ranges from 2:1 to 8:1.

17. The process according to claim 3 wherein in step (b), the reaction temperature is 300-500° C. and the reaction pressure is 2.0-4.0 MPa.

18. The process according to claim 6 wherein in step (b) the reaction temperature is 300-500° C. and the reaction pressure is 2.0-4.0 MPa.

19. The process according to claim 10 wherein the catalyst further comprises a promoter selected from Cu, Zn, Sn, Pb, Fe and mixture thereof in an amount of less than 0.6 wt % on the basis of the total weight of the catalyst.

20. The process according to claim 12 wherein the binder-free zeolite has a molar ratio $SiO_2/Al_2O_3$ in the range of 20-100.

21. The process according to claim 13, wherein the catalyst further comprises a promoter selected from Cu, Zn, Sn, Pb, Fe and mixture thereof in a amount less than 0.6% on the basis of the total weight the catalyst.

22. The process according to claim 15 wherein the binder-free zeolite has a molar ratio $SiO_2/Al_2O_3$ in the range of 20-100.

23. The process according to claim 1 wherein the amount of metallic Pt and/or Pd is of 0.01-0.5 wt % on the basis of the total weight of the catalyst.

* * * * *